United States Patent
Ewing et al.

[11] Patent Number: 5,184,455
[45] Date of Patent: Feb. 9, 1993

[54] CERAMIC BLANKET AUGMENTOR LINER

[75] Inventors: Joseph H. Ewing, Lake Pk.; John H. E. Baker, II, Palm Beach Gardens, both of Fla.

[73] Assignee: The United States of America as represented by the Secretary of the Air Force, Washington, D.C.

[21] Appl. No.: 727,726

[22] Filed: Jul. 9, 1991

[51] Int. Cl.⁵ .............................. F02C 1/00; F02G 3/00
[52] U.S. Cl. ..................................... 60/39.02; 60/725; 60/752; 60/753; 60/754
[58] Field of Search .................. 60/39.02, 725, 752, 60/753, 754; 431/350, 351, 352, 353

[56] References Cited

U.S. PATENT DOCUMENTS

| | | | |
|---|---|---|---|
| 2,919,549 | 1/1960 | Haworth et al. | 60/753 |
| 3,557,553 | 1/1971 | Schmitz | 60/39.65 |
| 3,918,255 | 11/1975 | Holden | 431/352 |
| 3,937,007 | 2/1976 | Kappler | 60/39.06 |
| 3,974,647 | 8/1976 | Lewis et al. | 60/39.72 P |
| 4,137,992 | 2/1979 | Herman | 181/213 |
| 4,168,950 | 9/1979 | Seemann et al. | 60/752 |
| 4,422,300 | 12/1983 | Dierberger et al. | 60/757 |
| 4,655,044 | 4/1987 | Dierberger et al. | 60/753 |
| 4,709,643 | 12/1987 | Moreno et al. | 60/752 |
| 4,833,881 | 5/1989 | Vdoviak et al. | 60/261 |
| 4,838,030 | 6/1989 | Cramer | 60/753 |
| 4,838,031 | 6/1989 | Cramer | 60/753 |
| 4,912,931 | 4/1990 | Joshi et al. | 60/752 |

Primary Examiner—Richard A. Bertsch
Assistant Examiner—Howard R. Richman
Attorney, Agent, or Firm—Robert L. Nathans; Donald J. Singer

[57] ABSTRACT

An aircraft augmentor cooling blanket is provided, which is woven from flexible refractory ceramic fibers, which blanket is bonded to a cooling air supply support structure by a metal wire woven through a lower blanket portion and brazed to the support structure. The resulting liner is lightweight, readily accommodates thermal expansion and contraction and absorbs sonic screech energy.

15 Claims, 1 Drawing Sheet

CERAMIC BLANKET AUGMENTOR LINER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of augmentor liners, particularly those used in aircraft combustion chambers.

Augmentor liners provide acoustic surpression of high cycle combustion instability, commonly known as screech, which may be defined as intense combustion induced, high frequency pressure oscillations which, under certain conditions, are generated in the augmentor. See U.S. Pat. No. 4,833,881. In conventional liners, this is achieved by providing screech holes in the liner. The hole area and underliner volume determine the screech absorption characteristics. The hole area required is usually much more than would be required to cool the liner so that much air is used inefficiently.

It is deemed desirable to provide means for absorbing screech which at the same time restricts the flow rate of cooling air so that less fan air is "used" by the liner and more is thus available for cooling use elsewhere.

BRIEF SUMMARY OF THE INVENTION

The aforesaid objective is attained by bonding a blanket woven from ceramic fibers to a support structure having cooling air supply holes therein. The bonding is preferably achieved by weaving metal fibers or wires into the interface side of the porous blanket and brazing the metal fibers to the support structure. The many small holes in the support structure supply cooling air to the blanket, which air "oozes" therethrough, for advantageously restricting the flow rate as mentioned above. The entangled fibrous ceramic fibers additionally absorb the sonic screech waves due to their flexibility while readily accommodating thermal expansion and contraction of the blanket.

BRIEF DESCRIPTION OF THE DRAWINGS

Other objects, features and advantages of the present invention will become apparent upon study of the following description taken in conjunction with FIGS. 1a and 1b which illustrate a preferred embodiment of the invention.

SPECIFIC DESCRIPTION

Figure 1A:
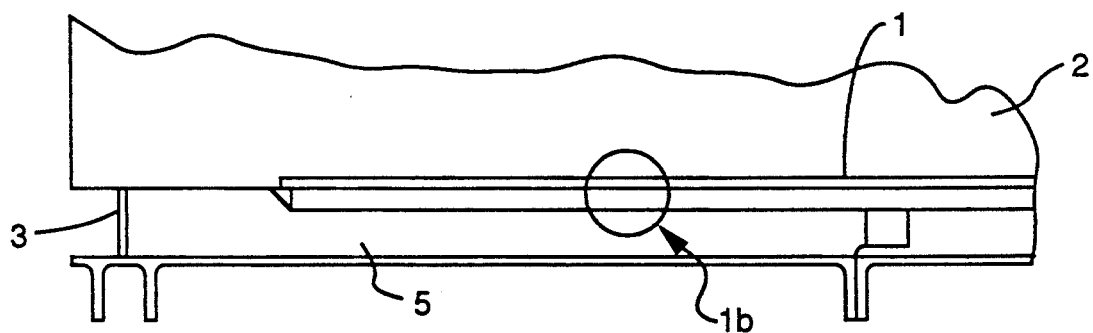
Figure 1B:
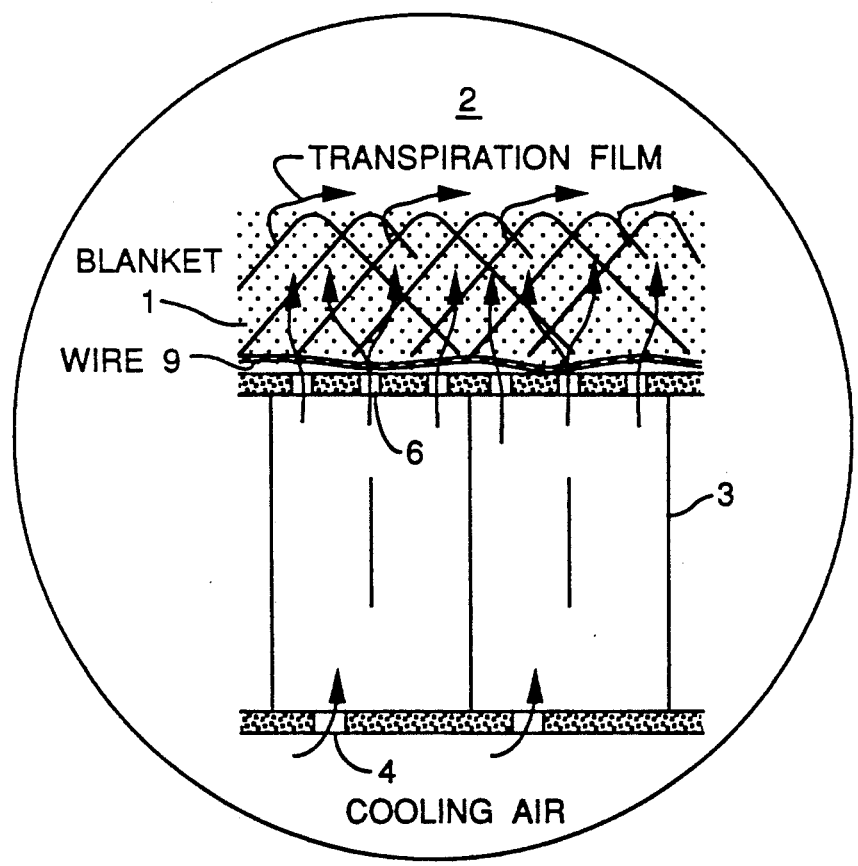

The coolant panel liner comprises a porous blanket 1 made of entangled fibrous ceramic fibers which is sufficiently porous to absorb sonic screech energy produced within the combustion chamber 2 while at the same time will suffer no thermal stress due to the thin flexible woven fibers. The fibers can take extremely large thermal gradients because they can easily bend to accommodate thermal growth. The blanket 1 also produces substantial mechanical impedance to the cooling air which "oozes" therethrough from apertured support structure 3 toward the combustion chamber.

The blanket can be made of ceramic refractory fibers readily available in the marketplace and sold under the trademark "Nextel". The blanket 1 is preferably about 0.1 to 0.2 inches thick, and the fibers preferably occupy about fifty percent of the volume of the blanket, in order to provide the aforesaid benefits with the greatest efficiency.

The blanket support structure 3 could be honeycomb, trusscore, catenary etc. Cooling air passageways 4 and 6 direct cooling air from pressurized duct 5 through the blanket to form the cooling air film covering the liner and formed within the combustion chamber 2.

The blanket is preferably bonded to the upper surface of support structure 3 by means of metal wires 9, woven through the lower portion of the blanket and affixed to the support structure by brazing. With the aforesaid blanket of 0.1–0.2 inches thick, and employing transpiration air cooling, the entire thermal gradient would be taken across the blanket. The metallic support structure would thus be operating at cooling air temperature, e.g. 700 degrees F. to permit lightweight titanium support structure to be used. Even lightweight composites such as graphite-polyimide or graphite-compglas could be employed.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A method of restricting cooling air flow through a cooling liner of a combustion chamber while at the same time absorbing sonic screech energy generated within said combustion chamber comprising the steps of:
   (a) mounting a coolant panel liner comprising a porous blanket woven from flexible refractory ceramic fibers, said blanket being bonded to a support structure positioned within said combustion chamber, said blanket being exposed to hot gases within said combustion chamber enabling said blanket to absorb said sonic screech energy generated within said combustion chamber; and
   (b) passing cooling air through said blanket in a direction toward said combustion chamber for producing transpiration cooling of said blanket.

2. Apparatus for cooling a combustion chamber while absorbing sonic screech energy comprising:
   (a) a porous blanket woven from flexible refractory ceramic fibers, said blanket being bonded to a support structure positioned within said combustion chamber, said blanket being exposed to hot gases therein and said blanket being sufficiently porous to absorb said sonic screech energy generated within said combustion chamber; and
   (b) means for directing cooling air through said porous blanket and toward said combustion chamber.

3. The cooling apparatus of claim 2 wherein said blanket comprises entangled fibrous ceramic fibers which are sufficiently flexible to readily accommodate thermal expansion and contraction of the fibers.

4. The cooling apparatus of claim 3 wherein said blanket is bonded to said support structure by wires affixed to said support structure and woven through said blanket.

5. The cooling apparatus of claim 2 wherein said blanket is bonded to said support structure by wires affixed to said support structure and woven through said blanket.

6. The cooling apparatus of any one of claims 2 and 3-4 wherein said ceramic fibers occupy about fifty percent of the volume of said blanket.

7. The cooling apparatus of any one of claims 1 and 3-4 wherein said blanket has a thickness of between 0.1 and 0.2 inches.

8. The cooling apparatus of claim 6 wherein said blanket has a thickness of between 0.1 and 0.2 inches.

9. Apparatus for cooling a combustion chamber while absorbing sonic screech energy consisting essentially of:
   (a) a porous blanket woven from flexible refractory ceramic fibers, said blanket being bonded to a support structure positioned within said combustion chamber, said blanket being exposed to hot gases therein and said blanket being sufficiently porous to absorb said sonic screech energy generated within said combustion chamber; and
   (b) means for directing cooling air through said porous blanket and toward said combustion chamber.

10. The cooling apparatus of claim 9 wherein said blanket comprises entangled fibrous ceramic fibers which are sufficiently flexible to readily accommodate thermal expansion and contraction of the fibers.

11. The cooling apparatus of claim 9 wherein said blanket is bonded to said support structure by wires affixed to said support structure and woven through said blanket.

12. The cooling apparatus of claim 10 wherein said blanket is bonded to said support structure by wires affixed to said support structure and woven through said blanket.

13. The cooling apparatus of any one of claims 10-12 and 9 wherein said ceramic fibers occupy about fifty percent of the volume of said blanket.

14. The cooling apparatus of any one of claims 10-12 and 9 wherein said blanket has a thickness of between 0.1 and 0.2 inches.

15. The cooling apparatus of claim 13 wherein said blanket has a thickness of between 0.1 and 0.2 inches.

* * * * *